Feb. 24, 1948. C. WILLIAMS 2,436,499
TRUCK SADDLE MOUNT
Filed Nov. 30, 1945

INVENTOR
CHESTER WILLIAMS

BY Edward M. Apple
ATTORNEY

Patented Feb. 24, 1948

2,436,499

UNITED STATES PATENT OFFICE 2,436,499

TRUCK SADDLE MOUNT

Chester Williams, Ypsilanti, Mich.

Application November 30, 1945, Serial No. 631,898

8 Claims. (Cl. 280—33.44)

This invention relates to truck towing apparatus, and has particular reference to a truck saddle mount adapted to be installed on a truck chassis whereby another truck may be hauled.

An object of the invention is the provision of a truck saddle mount which is universally applicable to the chassis of any truck.

Another object of the invention is the provision of a device of the character indicated, which is economical to manufacture, easy to install, light in weight, and collapsible so that it may be easily transported, shipped or stored when not in use.

Another object of the invention is the provision of a device of the character indicated, which is constructed and arranged so that the weight is equally distributed at four points.

Another object of the invention is the provision of a device of the character indicated, which is constructed and arranged so that the front end of a truck may be supported on a haul-away operation without the necessity of removing the front wheels of the truck being hauled.

Another object of the invention is the provision of a device for use in a truck haul-away operation, which eliminates all strain and twist on the truck frame.

The foregoing and other objects and advantages of the invention will appear as the description proceeds, reference being made from time to time to the accompanying drawings forming part of the within disclosure, in which drawings.

Figures 1, 2, 3:
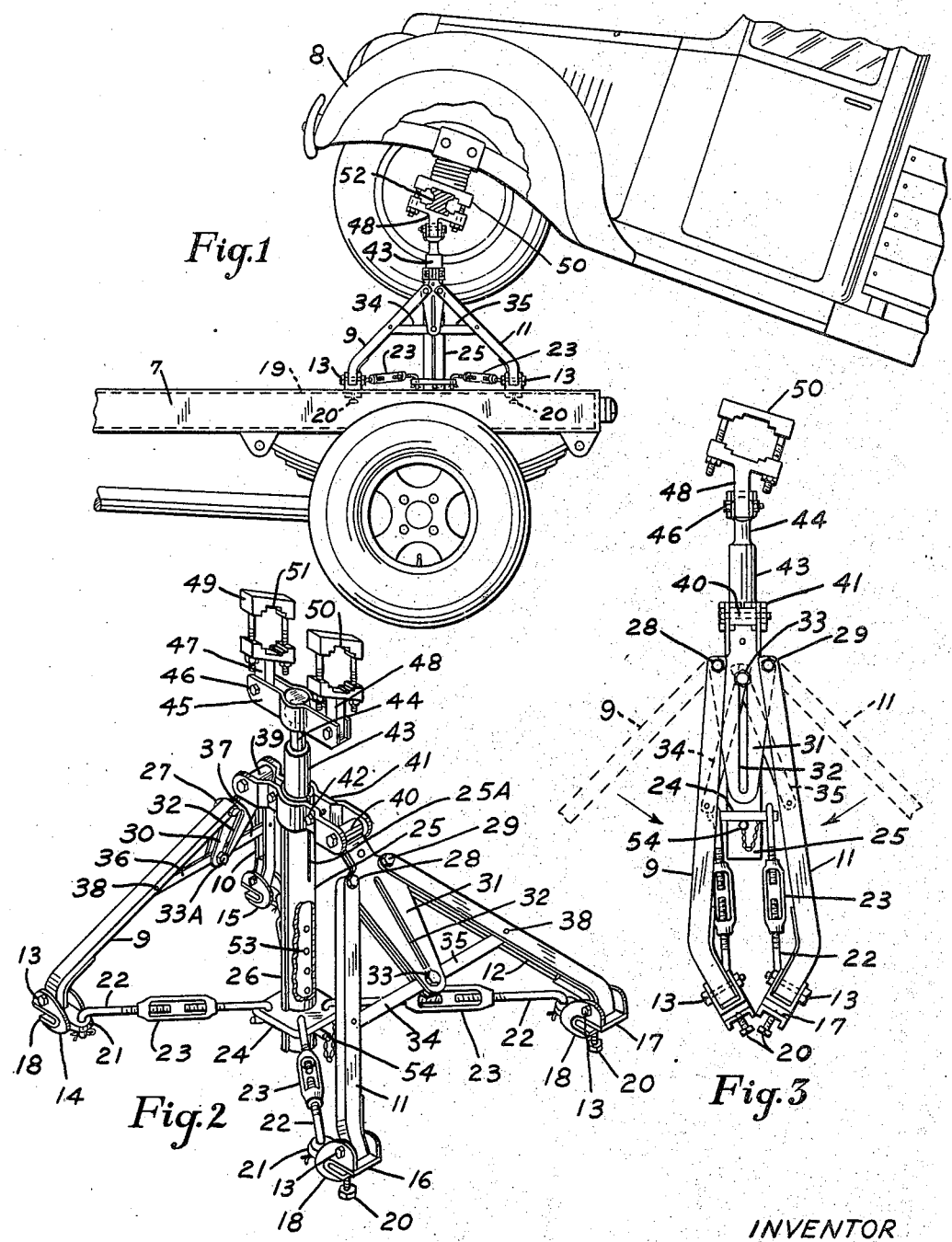
Fig. 1 is a side elevational view of a device embodying my invention, as employed in a haul-away operation, wherein the front end of a towed truck is mounted on the rear of the chassis of a towing truck.
Fig. 2 is a perspective view of my improved truck saddle mount in operating position.
Fig. 3 is a side elevational view of the device illustrated in Fig. 2, in collapsed or folded condition for transporting or storing.

Referring now more particularly to the drawings, it will be understood that my improved saddle mount is adapted to be mounted on the frame 7 of a transporting truck, so that the front end of a truck 8 may be secured thereto for towing.

In the embodiment herein disclosed, it will be understood that my improved device consists of four diverging legs 9, 10, 11, and 12, at the end of each of which is secured by bolts 13, clamp members 14, 15, 16, and 17, respectively. Each clamp 14, 15, 16, and 17 has a hook portion 18 adapted to engage the flanges 19 (Fig. 1) of the longitudinal members comprising part of the frame 7.

Set screws 20 are provided to assist in holding the clamps in position on the frame 7.

Each of the clamps 14, 15, 16, and 17 is provided with an extension member 21, having an opening therein adapted to engage one end of the tie rods 22, the latter being provided with turn buckles 23, whereby they may be adjusted for length. The other end of each tie rod 22 is secured in a suitable opening formed in the plate 24, which is adapted to slide on the tubular member 25, the latter being provided with a rib 26, which is arranged to engage a suitable slot in the plate 24 to prevent rotation of the plate on the tubular member 25.

The diverging legs 9, 10, 11, and 12 are arranged in pairs, which pairs are pivoted as at 27, 28, and 29 to members 30 and 31, each of which is longitudinally slotted as at 32 to accommodate bolts 33 and 33A, to which bolts are secured the respective ends of the cross arms 34, 35, 36, and 37, which are pivoted as at 38 to the diverging legs 9, 10, 11, and 12.

The members 30 and 31 are pivoted as at 39 and 40 to a yoke member 41, comprising matched plates secured together by means of bolts 42. The yoke member 41 is adapted to engage the outside of the tubular member 25, the latter being split as at 25A, so that it may be tightly clamped about a telescoping tubular member 43 when the bolts 42 are drawn up in the yoke 41.

A rod 44 slidably engages the telescoping tubular member 43, and has secured to its upper end, a yoke member 45, to which is secured by means of bolts 46, a pair of arms 47 and 48, to the ends of which are respectively secured the clamps 49 and 50, the inner surfaces of which are machined as at 51 to accommodate front truck axles 52 of various sizes. The member 43, and if desired the member 44, are provided with apertures 53, adapted to accommodate a pin 54 to lock the parts in various positions of vertical adjustment.

It will be seen that I have provided a device which has adjustments whereby the pairs of diverging legs may be spread to accommodate any width of truck frame, and the device may be vertically adjusted to accommodate any height desired.

It will also be seen that the device as shown in Fig. 3 may be folded or collapsed into a comparatively small area so that it may readily be transported or stored with a minimum of effort.

Having described my invention, what I claim and desire to secure by Letters Patent is:

1. In a device of the character described, the combination of a telescoping vertical member, oppositely disposed pairs of diverging legs secured to said vertical member, pivotable clamps at the ends of said diverging legs adapted to engage a truck frame, adjustable means connecting said clamps with said vertical member, and means at the end of said vertical member for supporting the front axle of a second truck.

2. The combination defined in claim 1, in which the diverging legs of each pair are pivoted to a common member, whereby said legs may be folded together.

3. The combination defined in claim 1, in which the diverging legs of each pair are pivoted to a common member, whereby said legs may be folded together, and there are cross arms pivoted to said diverging legs and slidably secured to said common member.

4. The combination defined in claim 1, including a yoke secured to the outside section of said vertical member, and a member pivoted to each end of said yoke, each of said last-named members being adapted to pivotally engage one pair of diverging legs.

5. The combination defined in claim 1, including means for securing the elements of said telescoping member in pre-determined vertical adjustment.

6. In a device of the character described, the combination of a telescoping vertical member, a yoke adjustably secured to said vertical member, an arm pivoted at each end of said yoke, a pair of diverging legs pivoted to each arm, cross arms pivoted to said diverging legs and slidably connected to said arm, a plate-like member slidably secured to said vertical member, a clamp at the end of each of said diverging legs, adjustable tie rods connecting said clamps and said plate-like member, a yoke at the upper end of said vertical member, and a clamp at each end of said yoke adapted to engage an automobile axle.

7. In a device of the character described, the combination of a vertical tubular member having a slotted portion, a yoke comprising matched plates adjustably secured to said tubular member, an angular arm pivoted at either end to said yoke, diverging legs pivoted to said arm, cross arms slidably secured to said arm and pivoted to said diverging legs intermediate their ends, clamps on the ends of said diverging legs, a slidable plate-like member on the exterior of said vertical member, adjustable tie rods connecting said clamps and said plate-like member, a vertical member telescoping said first-named vertical member, and means at the end of said last-named vertical member for securing thereto an automobile axle.

8. The combination defined in claim 7, including means for locking said vertical members in various positions of adjustment.

CHESTER WILLIAMS.

REFERENCES CITED

The following references are of record in the file of this patent:

UNITED STATES PATENTS

| Number | Name | Date |
| --- | --- | --- |
| 2,152,279 | Randall et al. | Mar. 28, 1939 |